UNITED STATES PATENT OFFICE.

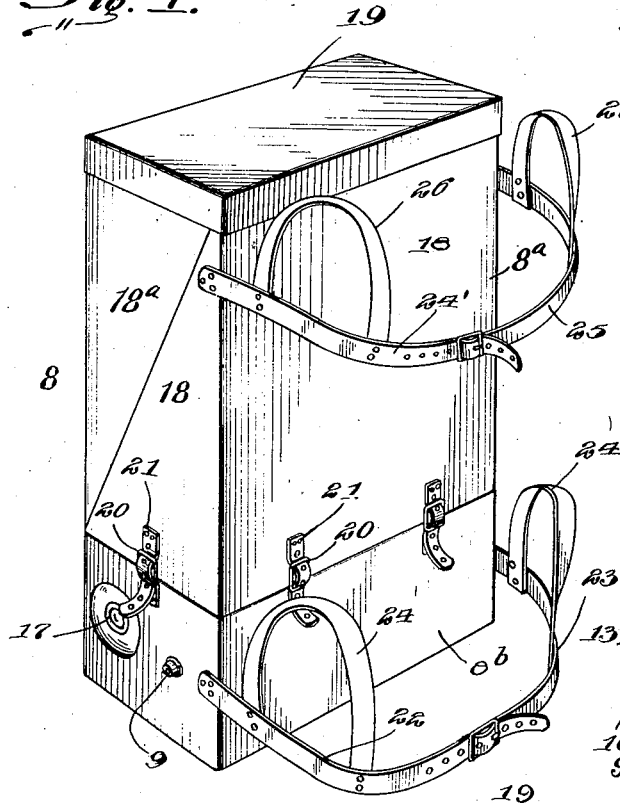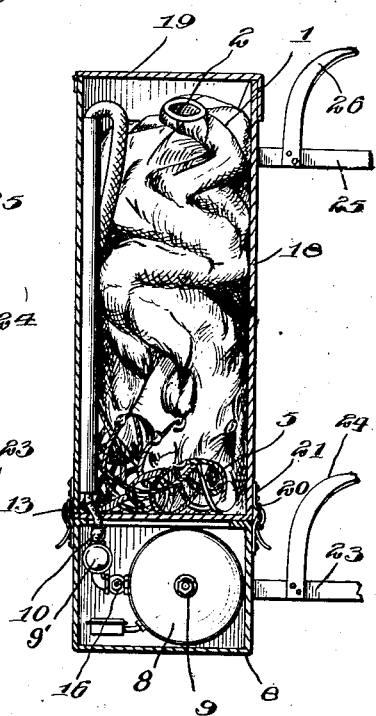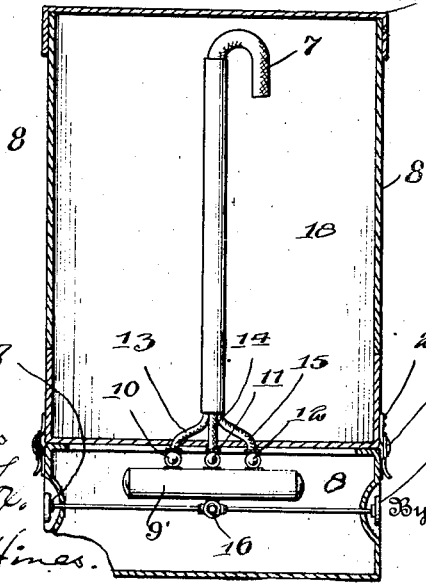

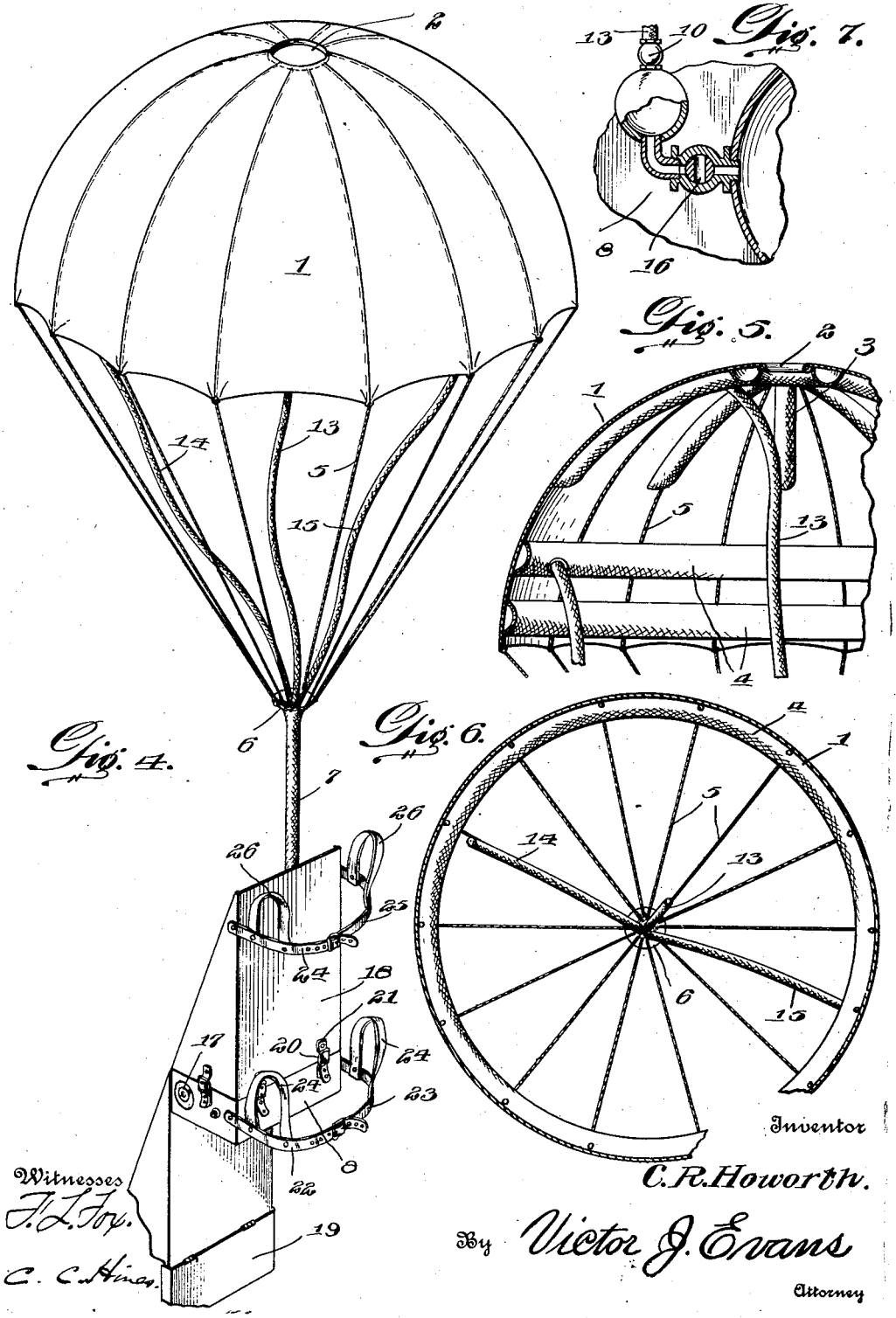

CLAUDE R. HOWORTH, OF FORT SCOTT, KANSAS.

SAFETY-PARACHUTE FOR AERONAUTS.

1,189,112.  Specification of Letters Patent.  Patented June 27, 1916.

Application filed August 24, 1915. Serial No. 47,099.

*To all whom it may concern:*

Be it known that I, CLAUDE R. HOWORTH, a citizen of the United States, residing at Fort Scott, in the county of Bourbon and State of Kansas, have invented new and useful Improvements in Safety-Parachutes for Aeronauts, of which the following is a specification.

My invention relates to safety parachutes for aeronauts and one of its objects is to provide a normally collapsed parachute which may be secured to the person of the aeronaut or upon the machine and thrown into action and employed by the aeronaut in case of danger to make a safe descent to the ground.

A further object of the invention is to provide a parachute which is adapted to be instantly inflated or expanded to an outspread condition by means of a charge of compressed air or gas.

A still further object of the invention is to provide a parachute which is simple of construction, positive, efficient and reliable in action, which when not in use will occupy but a comparatively small amount of space, and which may be readily and conveniently stored or transported.

The invention consists of the features of construction, combination and arrangement of parts herein fully described and claimed, reference being had to the accompanying drawings in which:—

Figure 1 is a perspective view of the device as normally collapsed within its casing or receptacle. Figs. 2 and 3 are vertical front to rear and vertical transverse sections, respectively, through the casing and collapsed parachute. Fig. 4 is a view of the parachute opened or outspread for use. Figs. 5 and 6 are vertical and horizontal sections, respectively, through the parachute body. Fig. 7 is an enlarged detail section showing the valve mechanism.

In carrying my invention into practice, I provide a parachute comprising an umbrella-shaped body 1, made of fabric or other suitable foldable or collapsible material and having the usual vent opening 2.

Secured to and arranged upon the interior of the parachute body are two sets of collapsible and expansible tubes 3 and 4, made of rubber or other suitable material. These tubes, when deflated, serve by their contractile energy to hold the parachute body collapsed, and they are adapted when expanded by compressed fluid to expand or open up the parachute to an out-spread condition.

The tubes 3 extend radially upon the interior of the parachute with respect to the crown portion thereof, while the tubes 4 extend circumferentially around the interior of the parachute and at right angles to the tubes 3. These tubes, in addition to their functions above stated, also serve to reinforce the parachute when expanded for use, and assist in maintaining its normal maximum or spread dimensions, and to prevent the parachute from turning inside out under atmospheric air pressure.

The depending marginal edge of the parachute body is connected by cords or wires 5 with a connector or coupling member 6, and these cords or wires may extend vertically throughout the fabric of the parachute to its top or crown portion to assist in giving additional strength to said body and to sustain the same against tearing or splitting strains. Secured at one end to the connector 6 is a flexible suspension tube or hose 7, which leads therefrom to a supporting member 8 which may be attached to the person of the wearer, to enable him to be supported from the parachute through the medium of the connecting pipe or tube 7 when the parachute is launched.

As shown in the present instance, the supporting member 8 includes casings $8^a$ and $8^b$, the lower casing $8^b$ serving as a container for a bottle or reservoir $8'$ for compressed air, gas or other fluid compressed to a desired density, said reservoir being provided with a check valved inlet 9. This reservoir is also provided with a manifold tube 9' communicating with the reservoir and having check valved outlets 10, 11, and 12, with which are connected the receiving ends of flexible or elastic conducting tubes 13, 14 and 15 which extend through the suspending pipe or tube 7 and connector 6, the discharge end of the tube 13 being in communication with the inflatable tubes 3 while the discharge ends of the tubes 14 and 15 are in communication at opposite sides of the parachute body with the tubes 4, the construction being such as to supply air uniformly to the inflatable tubes to equally and rapidly spread the parachute open. The manifold tube has its outlets controlled by a valve 16 provided at the opposite ends of the receptacle with controlling handles 17, so that it may be adjusted to open or closed positions from either side of said receptacle for the convenience of a right or left hand person or to suit any other conditions existing at the time.

The parachute when in collapsed condition is adapted to be stored within the knapsack-like upper casing 8ª, which is formed of hinged sections 18 and 18ª and hinged cover or section 19 adapted to be suitably held in closed position and to be released and swung downward to open position by gravity, as shown in Fig. 4. This casing 8ª rests at its bottom against the top of the lower casing 8ᵇ, which is provided with buckles 20 adapted to engage straps 21 on the casing 8ª whereby the reservoir and parachute casing are detachably connected. The casing 8ᵇ is provided with breast straps 22 and 23 adapted to be buckled together and to which are connected shoulder straps 24 by means of which the casing 8ᵇ when detached from the casing 8ª may be supported upon the body of the wearer. The casing 8ª is also provided with breast straps 24' and 25 and shoulder straps 26 for a similar purpose, so that it may be attached to the body like a knapsack for convenience in carrying the complete outfit from place to place. The aeronaut may, of course, wear the apparatus with the parachute stored within the casing, or he may remove the apparatus from the casing and attach the reservoir directly to his person the parachute being supported in the one case in the knapsack and in the other case in any suitable manner upon the machine, so that it will merely require an opening of the controlling valve for the flow of fluid pressure to the parachute to spread it open instantaneously.

Normally the parachute is inclosed in a collapsed condition in the casing 8ª, as shown in Fig. 2, but when the parachute is expanded it exerts a lifting pressure upon the door 19, thus opening the same, whereupon the casing section 18ª will swing down and release the parachute, as illustrated in Fig. 4, so that an instantaneous release and opening of the parachute for operation can be obtained at any time by simply opening the valve 16 for the flow of compressed air from the reservoir 8' to the air tubes of the parachute, as will be readily understood.

It will be apparent that the construction is such that the device may be made light in weight, readily and conveniently carried, and collapsed in close compass for storage or transportation, and that at any time when occasion demands the aeronaut may supply the compressed air or gas to the parachute to spread it open so that he may descend clear of the machine and be supported for safe descent to the ground.

I claim:—

1. A parachute including a fabric body, tubes extending circumferentially of the body, tubes extending radially of the body with respect to the crown portion thereof, cords extending radially within the body between the crown portion and basal edge thereof and having extensions projecting below the body, a suspending tube to which said cords are connected, air supplying means, and conductors leading from the air supplying means and through the said suspension tube to the said circumferential and radial tubes upon the parachute body.

2. A parachute including a casing having upper and lower compartments, a parachute adapted to be collapsed within the upper compartment, said parachute being provided with air tubes for expanding the same, a reservoir within the lower compartment, a suspension device connected with the parachute body, a manifold, supply tubes leading from the manifold to the first-named tubes, and a valved connection between said manifold and the reservoir.

3. A parachute including an upper casing composed of a pair of hinged sections and having a lid or cover hinged to one of said sections, said cover and one of the sections being adapted to open under pressure, a second casing arranged below and detachably secured to the first-named casing, means upon said casing for attaching the same to the person of the aeronaut or other wearer, an air reservoir within the lower casing, air supply tubes within the upper casing and in valve communication with said reservoir, and a parachute comprising a collapsible body adapted to be inclosed within the upper casing and having air tubes upon the interior thereof, said tubes being connected with said supply tubes, whereby the parachute may be spread by supplying air thereto from the reservoir and the hinged sections of the upper casing forced open to release the spread parachute.

In testimony whereof I affix my signature in presence of two witnesses.

CLAUDE R. HOWORTH.

Witnesses:
J. N. STANLEY,
W. H. HOWORTH.